(12) United States Patent
Pechanec et al.

(10) Patent No.: US 9,805,314 B2
(45) Date of Patent: Oct. 31, 2017

(54) STORING A BUSINESS PROCESS STATE

(75) Inventors: Jiri Pechanec, Mokra-Horakov (CZ); Martin Vecera, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 225 days.

(21) Appl. No.: 12/869,601

(22) Filed: Aug. 26, 2010

(65) Prior Publication Data

US 2012/0054111 A1    Mar. 1, 2012

(51) Int. Cl.
*G06Q 10/00* (2012.01)
*G06Q 10/10* (2012.01)

(52) U.S. Cl.
CPC .......... *G06Q 10/00* (2013.01); *G06Q 10/103* (2013.01)

(58) Field of Classification Search
CPC ..................................................... G06Q 10/00
USPC ........................................................ 705/301
See application file for complete search history.

(56) References Cited

U.S. PATENT DOCUMENTS

| | | | |
|---|---|---|---|
| 2004/0255048 A1* | 12/2004 | Lev Ran et al. | 709/249 |
| 2007/0220030 A1* | 9/2007 | Bollinger et al. | 707/101 |
| 2008/0155330 A1* | 6/2008 | Van Wyk et al. | 714/35 |
| 2008/0300928 A1* | 12/2008 | Racca et al. | 705/7 |
| 2009/0063420 A1* | 3/2009 | Surtani | G06F 11/1666 |
| 2009/0064104 A1* | 3/2009 | Baeyens et al. | 717/114 |
| 2011/0004627 A1* | 1/2011 | Reca et al. | 707/778 |
| 2011/0258579 A1* | 10/2011 | Nanjundaswamy | G06F 11/362 715/810 |

OTHER PUBLICATIONS http://publib.boulder.ibm.com/infocenter/dmndhelp/v6r2mx/index.jsp?topic=/com.ibm.wbit.620.help.bpel.ui.doc/concepts/cjvameth.html (4 pages, 2009).*
http://www.jboss.org/infinispan/ from way back machne, Jun. 2009, 2 pages.*
Jeff Hanson, "Manage your business processes with JBoss JBPM", May 22, 2006, 10 pages.*

* cited by examiner

*Primary Examiner* — Kira Nguyen
(74) *Attorney, Agent, or Firm* — Lowenstein Sandler LLP

(57) ABSTRACT

An apparatus and a method for storing a BPM process state is described. A process engine generates a business process state. The business process state is stored in a memory grid of a tree structured cache nodes. A converter converts the business process state to a plain text file or a binary format file prior to storing the business process state.

18 Claims, 4 Drawing Sheets

STORING A BUSINESS PROCESS STATE

TECHNICAL FIELD

Embodiments of the present invention relate to computing systems, and more particularly, to an engine for processing Business Process Management (BPM) workflow.

BACKGROUND

Business Process Management (BPM) is a computer-based automation of an organization's business processes. It is composed of a sequence of activities (work tasks), interactions with human resources (users), or IT resources (software applications and databases), as well as rules controlling the progression of processes through the various stages associated with each activity.

At the various stages of the process, activities may require human interactions, typically user data entry through a form. They may also interact with IT applications or data sources to exchange information in various formats, such as files, e-mails, database content, etc.

One of the ways to automate processes is to develop or purchase an application that executes the required steps of the process; however, in practice, these applications rarely execute all the steps of the process accurately or completely. Another approach is to use a combination of software and human intervention; however this approach is more complex, making the documentation process difficult.

As a response to these problems, software has been developed that enables the full business process (as developed in the process design activity) to be defined in a computer format. A BPM process engine typically stores the state of a business process (for example, waiting for an input of a user, waiting for a status of a related process, etc. . . . ) in a database of a disk-based storage device. Such database requires that the state of the business process be formatted in a specific way in order to conform with the database requirements. As such, BPM process engine needs to be specifically configured to be able to communicate with the database. Therefore, raw data from the state of a business process needs to be processed into the proper specific database format. Such configuration requires precious limited computing resources.

BRIEF DESCRIPTION OF THE DRAWINGS

The present invention is illustrated by way of example, and not by way of limitation, in the figures of the accompanying drawings and in which.

DETAILED DESCRIPTION

Described herein is an apparatus and a method for storing a Business Process Management (BPM) process state. A process engine generates a business process state. The business process state is stored in a memory grid of a tree structured cache nodes. A converter converts the business process state to a plain text file prior to storing the business process state. In another embodiment, the converter converts the business process to serialized Java objects.

The term Business Process Management refers to a set of activities enterprises can employ to automate and optimize business processes. BPM is embodied in three distinct practices:

1. Process design: The task of designing existing and new processes.

2. Process execution: The execution of an automated sequence of related events involving software processes and/or human activities.

3. Process monitoring: Observance and auditing of the state of individual processes so that the statistics and performance of these processes can be recorded, reported, and optimized.

The present application addresses the state of the process execution and process monitoring. In particular, the state of the process is to be stored in a manner that requires less computing resource.

Figure 1:
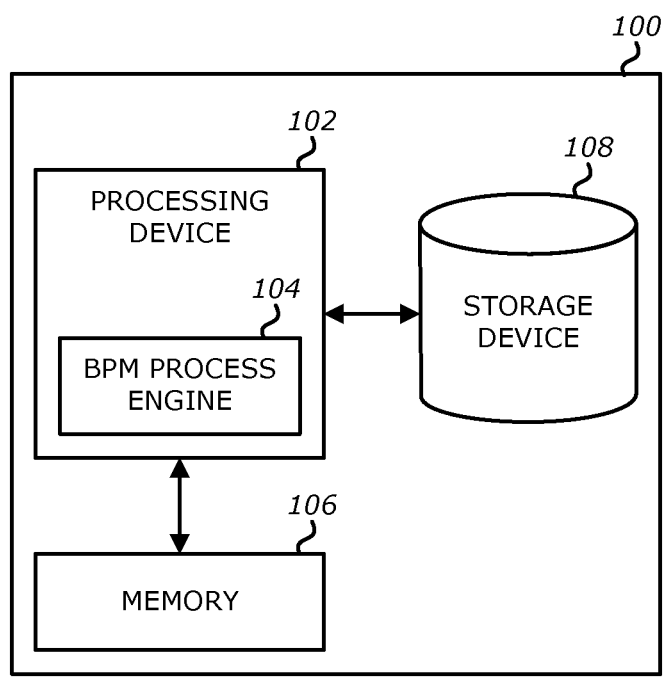
FIG. 1 is a block diagram illustrating one embodiment of a BPM system.

FIG. 1 illustrates one embodiment of a BPM system 100 having a processing device 102, a memory 106 (e.g. RAM), and a disk-based storage device 108. Processing device 102 includes a BPM process engine 104 that is configured to model and execute process-based applications.

Data storage device 108 may include a non-transitory computer-accessible storage medium on which is stored one or more sets of instructions embodying any one or more of the methodologies or functions described herein. The software may also reside, completely or at least partially, within a main memory and/or within a processing device during execution thereof by the computer system, the main memory and the processing device also constituting computer-accessible storage media. The software may further be transmitted or received over a network via the network interface device.

Processing device 102 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device 102 is configured to execute BPM process engine 104 for performing the operations and steps discussed herein with. In one embodiment, BPM process engine 104 may include hardware or software or a combination of both. The components of BPM process engine 104 are further described below.

Figure 2:
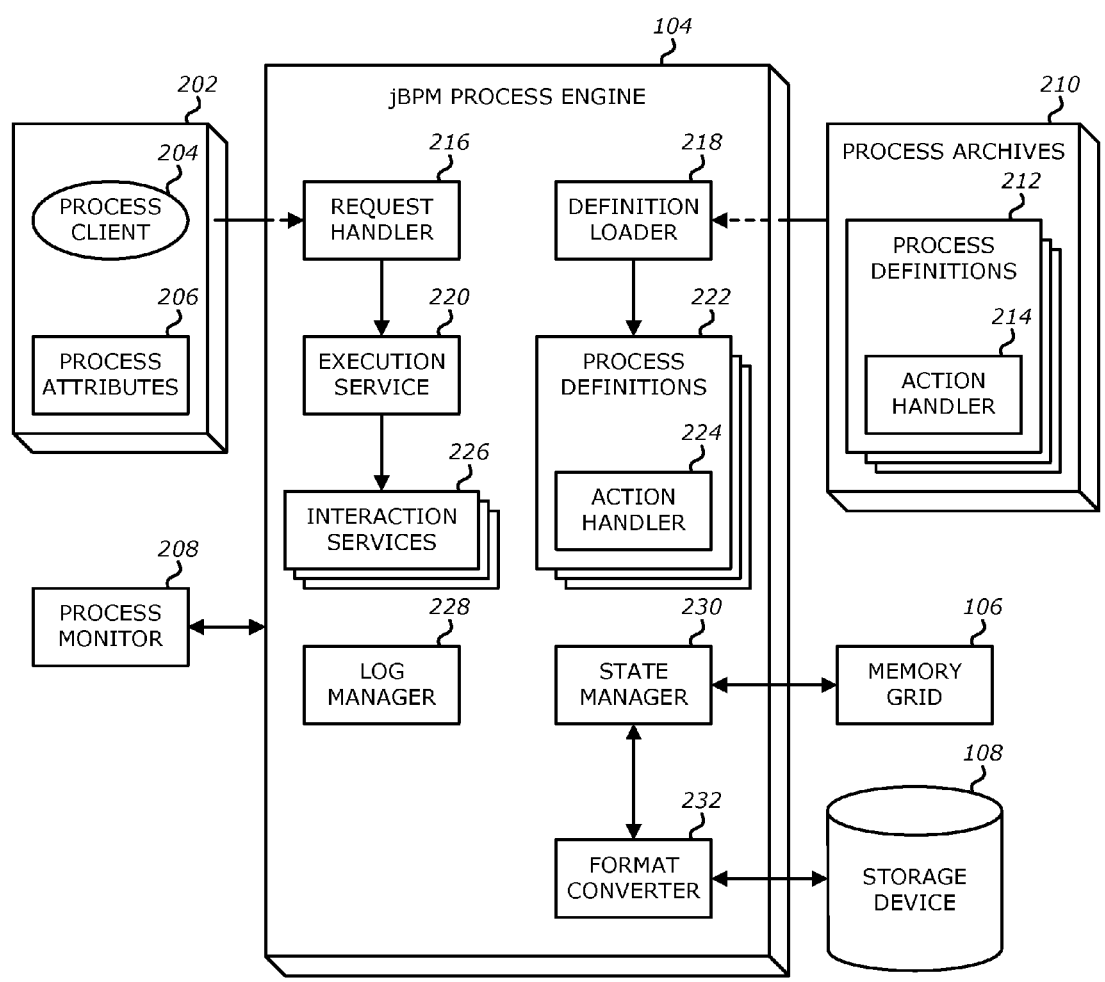
FIG. 2 is a block diagram illustrating one embodiment of a BPM process engine.

FIG. 2 is a block diagram illustrating one embodiment of such a BPM system 200. BPM system 200 includes a client 202 communicating with a BPM process engine 104. In one embodiment, BPM process engine 104 is part of processing device 102 of computing system 100 as illustrated in FIG. 1.

In one embodiment, client 202 communicates with BPM process engine 104 over a computer network. Client 202 may be a computing device configured to communicate with BPM process engine 104. In one embodiment, client 202 includes a process client 204 and process attributes 206. Process client 204 is configured to order a BPM process computation according to process attributes 206. The request for the BPM process computation is forwarded to process engine 104 for the actual computation.

Request handler 216 of process engine 104 receives and identifies the request from process client 204. Request handler 216 then forwards the request to execution service module 220. Execution service module 220 is configured to compute the BPM process. In some cases, the computation of the BPM process may rely on input from other modules or users through interaction services 226. Interaction services module 226 also includes services exposing legacy applications as functions or data to be used in process executions.

In one embodiment, process engine 104 includes a process definition loader 218 that defines process definitions 222 within files written using JBoss process definition language. Process definition module 222 includes process definition language (jPDL) based on graphic-oriented programming. jPDL is a graphic-oriented programming (GOP) language based on a model of nodes, transitions, and actions. In this model, nodes are commands executed as they are encountered during the flow of a process definition. Transitions direct the flow of execution of a process definition. Actions perform specific logic as a node or transition event occurs. Process definition module 222 includes action handler module 224. Action handler module 224 is configured to perform the specific logic as specified by process definition 222. When process engine 104 encounters a node in process definition 222 that has an action associated with it, all related action handlers are invoked. Action handlers 224 are instances of Java code that interact with external systems when executed.

BPM system 200 also includes process definitions 212 and action handler module 214 that are packaged as process archives 210. A process archive 210 is passed to process engine 104 for execution. In one embodiment, process archives 210 are stored in memory 106 of computing system 100. In another embodiment, process archives 210 are stored in disk-based storage device 108 of computing system 100 or another memory or disk-based storage device of other computing systems.

Process engine 104 traverses a process graph and executes defined actions. BPM system 200 also includes a process monitor module 208, a log manager 228, a state manager 230, a format converter 232, a memory grid 106, and a storage device 108.

Process monitor module 208 monitors processes. Process monitor module 208 tracks, audits, and reports the state of processes as they execute. Log manager 228 logs all process events.

State manager 230 maintains process states in a memory grid 106 and/or a disk-based storage device 108. In one embodiment, instead of storing process states in a database, process states are stored in tree-based cache nodes memory grid such as Infinispan of Red Hat, Inc. Memory grid 106 may be part of computing system 100 or may be external to computing system 100. For example, memory grid 106 may reside in one or more computing system communicating with computing system 100. In another embodiment, memory grid 106 may partially reside in computing system 100 and form a network of cache nodes with other memory grids from other computing systems.

In one embodiment, memory grid 106 includes Infinispan which is a scalable data grid platform written in Java. This type of memory grid exposes a data structure that is highly concurrent while at the same time providing distributed cache capabilities. It is also backed by a peer-to-peer network architecture to distribute state efficiently around a data grid.

The following is an example of inserting a ProcessInstance Java object into a Java-based data grid (e.g. Infinispan).

Step 1: Create a Cache Manager
CacheManager manager=new DefaultCacheManager( );
if one wants to create a cluster-enabled cache, use:
CacheManager manager=new DefaultCacheManager( GlobalConfiguration.getClusteredDefault( ));
or, if one could create its own GlobalConfiguration instance with its own customizations and pass this in to the constructor:
GlobalConfiguration myGlobalConfig=new GlobalConfiguration( );
// configure myGlobalConfig accordingly
CacheManager manager=new DefaultCacheManager (myGlobalConfig);
Step 2: Create a Cache
To get the default cache:
Cache cache=manager.getCache( );
To get a custom cache, one needs to register it with the manager first:
Configuration config=new Configuration( );
// configure your config bean accordingly
manager.defineConfiguration("myCustomCache", config);
Cache customCache=manager.getCache("myCustomCache");
Step 3: Use the Cache
cache.put("key", "value");
assert cache.size( )==1;
assert cache.containsKey("key");
Object v=cache.remove("key");
assert v.equals("value");
assert cache.isEmpty( );
// remember that Cache extends ConcurrentMap!
cache.put("key", "value");
cache.putIfAbsent("key", "newValue");
assert "value".equals(cache.get("key"));
cache.clear( );
assert cache.isEmpty( );
Step 4: Set Expiry for Entries
By default entries are immortal but you can override this on a per-key basis and provide lifespans.
cache.put("key", "value", 60, TimeUnit.SECONDS);
assert cache.containsKey("key");
Thread.sleep(60000);
assert ! cache.containsKey("key");
By directly accessing a memory grid 106, process engine 104 can efficiently store the state faster than when accessing a database of a disk-based storage device. Access to process states stored in solid-state devices or cache nodes provide faster access than disk-bases storage.

In another embodiment, a format converter 232 converts the format of the process states to a plain text file (or any other binary format) and stores the process state in a disk-based storage device (e.g. hard disk drive). As such, state manager 230 avoids communicating with a database that requires a lot of resources to communicate with (e.g. multiple tables, formats, etc. . . . ).

In yet another embodiment, format converter 232 coverts the format of the process state to a plain text file and stores the converted process state in memory grid 106. The raw process state file or the converted plain text file from the process state is then stored in memory grid 106 for even faster access than disk-based storage device 108.

In another embodiment, disk-based storage device 108 may reside in one or more other computing systems communicating with computing system 100.

While the computer-accessible storage medium is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

Figure 3:
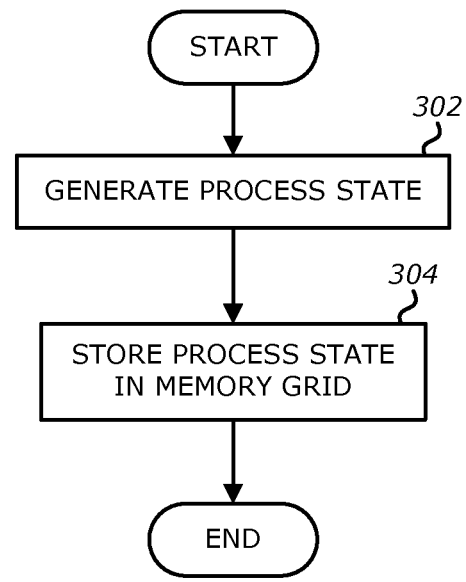
FIG. 3 is a flow diagram illustrating one embodiment of a method for storing a BPM process state.

FIG. 3 is a flow diagram illustrating one embodiment of a method for storing a BPM process state. At 302, BPM process engine 104 generates a business process state at the request of a process client 204. BPM process engine 104 loads process definitions from process archives 210 to determine how to compute the business process state. BPM process engine 104 then executes the BPM process according the loaded process definitions 222. State manager module 230 manages the current state of the BPM process by storing the computed BPM process state in a memory grid of a tree structured cache nodes at 304.

In one embodiment, the business process state is maintained with a ProcessInstance Java object. The tree structured cache nodes includes a Java-based data grid. The ProcessInstance Java Object is directly inserted into the Java-based data grid.

Figure 4:
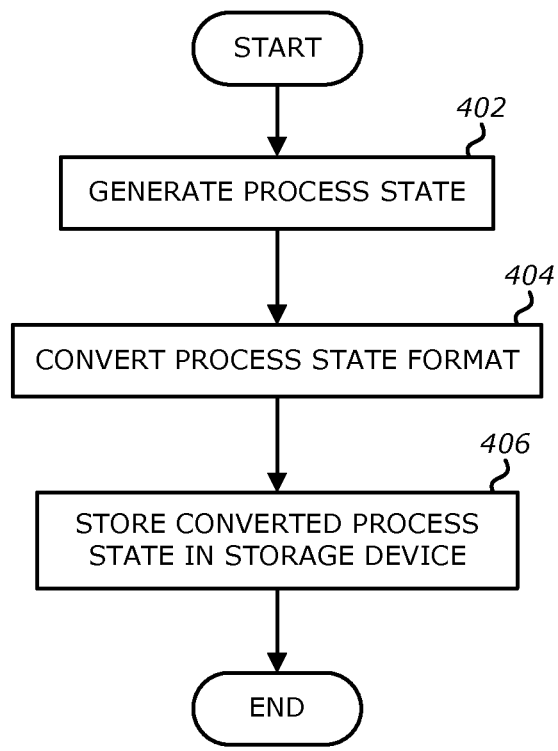
FIG. 4 is a flow diagram illustrating one embodiment of a method for storing a BPM process state.

FIG. 4 is a flow diagram illustrating another embodiment of a method for storing a BPM process state. At 402, BPM process engine 104 generates a business process state at the request of a process client 204. BPM process engine 104 loads process definitions from process archives 210 to determine how to compute the business process state. BPM process engine 104 then executes the BPM process according the loaded process definitions 222.

State manager module 230 manages the current state of the BPM process by converting at 404 the BPM process state with a format converter 232 to a plain text file (or any other predetermined format) prior to storing the business process state. Such format would require less computing overhead that the format specified from a database. At 406, the converted plain text file is stored in disk-based storage device 108.

Figure 5:
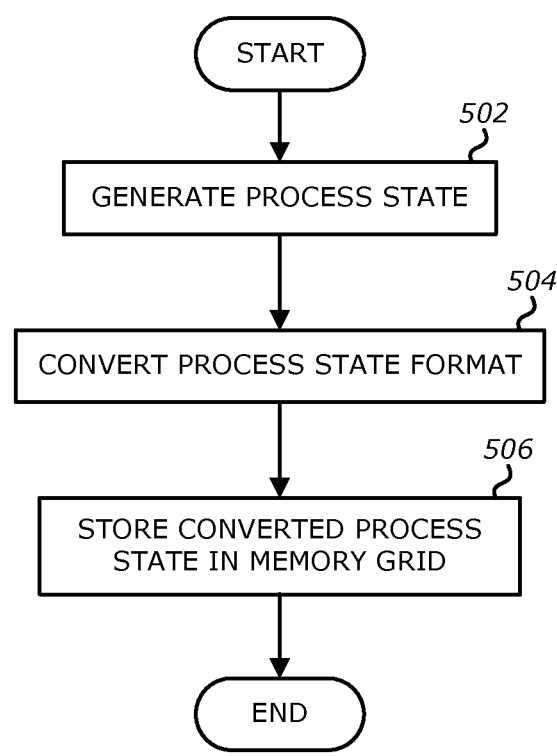
FIG. 5 is a flow diagram illustrating one embodiment of a method for storing a BPM process state.

FIG. 5 is a flow diagram illustrating yet another embodiment of a method for storing a BPM process state. At 502, BPM process engine 104 generates a business process state at the request of a process client 204. BPM process engine 104 loads process definitions from process archives 210 to determine how to compute the business process state. BPM process engine 104 then executes the BPM process according the loaded process definitions 222.

State manager module 230 manages the current state of the BPM process by converting at 504 the BPM process state with a format converter 232 to a plain text file (or any other predetermined format) prior to storing the business process state. Such format would require less computing overhead that the format specified from a database. At 406, the converted plain text file is stored in a memory grid.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving a first process definition, the first process definition comprising a command, a transition that directs an execution of the command, and an action handler module, the action handler module comprising an instance of code that, when executed, performs a logic operation in conjunction with the transition;
   loading a second process definition from a process archive;
   generating, in view of the command, the transition, the action, and a request from a process client, a business process state;
   executing the business process state in view of the first process definition and the second process definition;
   converting, by a processing device executing a format converter, the business process state, as executed, into a serialized Java™ object; and
   storing, by the processing device executing a state manager communicably coupled to the format converter, the business process state, as converted into the Java™ object in a memory grid of cache nodes comprising a Java™-based data grid, by:
      creating a cluster-enabled distributed cache manager for the Java™-based data grid;
      creating a cluster-enabled distributed cache of the Java™-based data grid using the cluster-enabled distributed cache manager; and
      inserting the business process state, as converted into the Java™ object, into the cluster-enabled distributed cache using a key-value pair.

2. The method of claim 1 wherein the business process state as converted into the Java™ object comprises a plain text file or a binary format file.

3. The method of claim 1 wherein the business process state as converted into the Java™ object comprises a ProcessInstance Java™ object.

4. The method of claim 1 further comprising incrementing a size of the cluster-enabled distributed cache after the Java™ object is inserted.

5. The method of claim 3 wherein storing the business process state as converted into the Java™ object comprises inserting the ProcessInstance Java™ Object into the cluster-enabled distributed cache of the Java™-based data grid.

6. A non-transitory computer-readable storage medium, having instructions stored thereon, which when executed by a processing device, cause the processing device to:
   receive a first process definition, the first process definition comprising a command, a transition that directs an execution of the command, and an action handler module, the action handler module comprising an instance of code that, when executed, performs a logic operation in conjunction with the transition;
   load a second process definition from a process archive;
   generate, in view of the command, the transition, the action, and a request from a process client, a business process state;
   execute the business process state in view of the first process definition and the second process definition;
   convert, by the processing device, the business process state, as executed, into a serialized Java™ object; and
   store the business process state, as converted into the serialized Java™ object in a memory grid of cache nodes comprising a Java™-based data grid, by the processing device further to:
      create a cluster-enabled distributed cache manager for the Java™-based data grid;
      create a cluster-enabled distributed cache of the Java™-based data grid using the cluster-enabled distributed cache manager; and
      insert the business process state, as converted into the Java™ object into the cluster-enabled distributed cache using a key-value pair.

7. The non-transitory computer-readable storage medium of claim 6 wherein the business process state as converted into the Java™ object comprises a plain text file or a binary format file.

8. The non-transitory computer-readable storage medium of claim 6 wherein the business process state as converted into the Java™ object comprises a ProcessInstance Java object.

9. The non-transitory computer-readable storage medium of claim 6 wherein the processing device is further to increment a size of the cluster-enabled distributed cache after the Java™ object is inserted.

10. The non-transitory computer-readable storage medium of claim 8 wherein storing the business process state as converted into the Java™ object comprises inserting the ProcessInstance Java™ Object into the cluster-enabled distributed cache of the Java™-based data grid.

11. A system comprising:
   a memory grid of cache nodes; and
   a processing device operatively coupled to the memory grid, the processing device to:
      receive a first process definition, the first process definition comprising a command, a transition that directs an execution of the command, and an action handler module, the action handler module comprising an instance of code that, when executed, performs a logic operation in conjunction with the transition;
      load a second process definition from a process archive;
      generate, in view of the command, the transition, the action and a request from a process client, the business process state;
      convert the business process state, as executed, into a serialized Java™ object; and
      store the business process state, as converted into the serialized Java™ object in a memory grid of cache nodes comprising a Java™-based data grid, by the processing device further to:
         create a cluster-enabled distributed cache manager for the Java™-based data grid;
         create a cluster-enabled distributed cache of the Java™-based data grid using the cluster-enabled distributed cache manager; and
         insert the business process state, as converted into the Java™ object into the cluster-enabled distributed cache using a key-value pair.

12. The system of claim 11 wherein the business process state as converted into the Java™ object comprises a plain text file or a binary format file.

13. The system of claim 11 wherein the business process state as converted into the Java™ object comprises a ProcessInstance Java object.

14. The system of claim 13 wherein the wherein the processing device is further to increment a size of the cluster-enabled distributed cache after the Java™ object is inserted.

15. The system of claim 14 wherein the processing device is to store the business process state as converted into the Java™ object by inserting the ProcessInstance Java™ Object into the Java™-based data grid.

16. The method of claim 1 wherein the business process state as converted into the Java™ object comprises a plurality of serialized objects.

17. The non-transitory computer-readable storage medium of claim 6 wherein the business process state as converted into the Java™ object comprises a plurality of serialized objects.

18. The system of claim 11 wherein the business process state as converted into the Java™ object comprises a plurality of serialized objects.

\* \* \* \* \*